(12) United States Patent
Hans

(10) Patent No.: US 7,081,694 B2
(45) Date of Patent: Jul. 25, 2006

(54) LEAD FRAME FOR CONNECTING ELECTRONIC COMPONENTS OF AN ELECTRIC MOTOR

(75) Inventor: Helmut Hans, Sankt Georgen (DE)

(73) Assignee: Minebea Co., Ltd., Nagano-ken (JP)

( * ) Notice: Subject to any disclaimer, the term of this patent is extended or adjusted under 35 U.S.C. 154(b) by 1 day.

(21) Appl. No.: 10/671,936

(22) Filed: Sep. 29, 2003

(65) Prior Publication Data

US 2004/0124726 A1    Jul. 1, 2004

(30) Foreign Application Priority Data

Nov. 11, 2002    (DE) ................................ 102 52 315

(51) Int. Cl.
*H02K 11/00* (2006.01)

(52) U.S. Cl. .......................................... 310/71; 310/64
(58) Field of Classification Search ................ 310/71, 310/68 R, 68 D, 64
See application file for complete search history.

(56) References Cited

U.S. PATENT DOCUMENTS

| | | | | |
|---|---|---|---|---|
| 3,662,196 A | | 5/1972 | Ruschmann | 310/68 B |
| 3,984,712 A | | 10/1976 | Hill | 310/71 |
| 4,642,496 A | * | 2/1987 | Kerviel et al. | 310/68 B |
| 4,664,466 A | * | 5/1987 | Bleger et al. | 439/544 |
| 4,724,347 A | * | 2/1988 | Reinhardt et al. | 310/68 R |
| 5,119,466 A | * | 6/1992 | Suzuki | 388/831 |
| 5,861,689 A | | 1/1999 | Snider et al. | 310/71 |
| 2004/0027014 A1 | * | 2/2004 | Weigold et al. | 310/68 R |
| 2004/0124726 A1 | * | 7/2004 | Hans | 310/71 |

FOREIGN PATENT DOCUMENTS

| | | |
|---|---|---|
| DE | 3432856 | 3/1986 |
| DE | 19735403 | 1/1999 |

* cited by examiner

*Primary Examiner*—Karl Tamai
(74) *Attorney, Agent, or Firm*—Duane Morris LLP

(57) ABSTRACT

Device for connecting electronic components for driving an electric motor with a lead frame having tracks for connecting the power supply and phase windings of the electric motor, the tracks of the lead frame being designed for direct connection of the electronic components.

7 Claims, 3 Drawing Sheets

LEAD FRAME FOR CONNECTING ELECTRONIC COMPONENTS OF AN ELECTRIC MOTOR

FIELD OF THE INVENTION

The invention relates to a device for connecting electronic components used to drive an electric motor. Such a device consists of a connecting component e.g. in the form of a lead frame which has tracks for the connection of the electrical motor supply lines and phase windings.

BACKGROUND OF THE INVENTION

The invention is utilized in particular in the area of electronically-commutated brushless direct current (DC) motors, but is not limited to DC motors. Motors of this kind can be used in a variety of applications, examples being in automotive engineering, cooling pumps or steering support systems. Other application areas include ventilator fans in power supply units, or spindle motors in disk drives for data processing systems, just to mention a few.

An electronically-commutated, brushless motor basically consists of a shaft, a rotor assembly equipped with one or more permanent magnets arranged on the shaft, and a stator assembly which incorporates a stator core and phase windings. Two bearings are mounted on the shaft at an axial distance to each other for rotatably supporting the rotor assembly and the stator assembly relative to each other.

FIG. 1 shows a schematic circuit diagram of a drive circuit for a three-phase motor. The drive circuit in the illustrated example has six power transistors and additional further electronic components (not shown) which control motor operation. It is known in the prior art to design the motor drive electronics as an complete unit on a printed circuit board which is fitted to the motor as a plug-in unit or by other means. The connection between the PCB and the motor is established via connecting wires and cables which are connected to the PCB by soldering, plugging or similar means. Plug and solder connections as well as the wire lengths between the motor and the PCB increase the electrical resistance of the motor and, consequently, reduce the electrical voltage available at the motor winding terminals.

Connections which can have a negative influence on the electrical resistance of the motor are created inside and outside a motor in the following areas (just to give a few examples): the connection of the motor phase windings with the neutral point (Y connection) in the case of a three-phase motor; the connection of windings belonging to one phase; the connection of the phase windings with a plug fitted to the motor housing or a cable; or the connection between such a plug and the electronics via a further plug connector or via a further solder connection to the electronics.

From an earlier German patent application of the same applicant dated the $22^{nd}$ of June 2001 (with the reference number 101 30 117.0) it is known in general to connect the endings of phase windings within the motor via lead frames. These lead frames have tracks stamped out of a sheet metal, the tracks being separated from each other by electrically-insulated material. Lead frames can be integrated in a plastic support component. The endings of the phase windings of the motor are connected to the lead frame by soldering, welding or a plug connection. In this application it has been described that signal wires in the motor drive electronics are connected via a plug/socket section. Relays are contained in a plastic support component designed for this purpose. The electronic components for the motor drive device are arranged on their own PCB, this being connected with the aforementioned signal wires. This causes the disadvantage described above resulting in increased resistance caused by plug or solder connections and additional cable wire lengths.

An object of the invention is therefore to provide a device for connecting electronic components in an electronic drive circuit for an electric motor which minimizes losses caused by plug or solder connections and the lengths of cable wires and, in particular, reduces the number of connections and cable wire lengths to a minimum.

SUMMARY OF THE INVENTION

According to the present invention, a device for connecting electronic components for driving an electric motor is provided with a connecting component in the form of a lead frame having tracks for connecting the power supply wires and the phase windings of the electric motor. The tracks of the lead frame are designed to enable direct connection of the electronic components to the lead frame. Preferably the lead frame is designed such that it can be used as a direct or indirect support for the electronic components. It is particularly intended that the lead frame is utilized directly as a support for the power transistors for driving the motor, or such that the pins of the power transistors can be directly connected to the lead frame. This enables the reduction of cable wire lengths between the motor and the electronic components and reduces the resistance of the connections.

In a preferred embodiment of the invention the lead frame has a rotationally symmetrical shape, with the electronic components arranged on the lead frame in a rotationally symmetrical manner. This enables connection of the lead frame tracks and the electronic components with the associated motor phase windings along the shortest distance, thus minimizing losses caused by cable wire lengths. The lead frame can be flat, designed in a single plane or have a three-dimensional shape. A three-dimensional lead frame e.g. with elements and tabs bent at an angle which protrude from the tracks can more effectively dissipate the heat which is generated by the electronic components. Additionally, a support component can be inserted between the lead frame and the electronic components. This preferably acts as a heat sink and can have the shape of a metal plate.

SHORT DESCRIPTION OF THE DRAWINGS

The invention is explained in more detail below on the basis of a preferred embodiment and with reference to the drawings, wherein.

DETAILED DESCRIPTION OF PREFERRED EMBODIMENT

Figure 1:
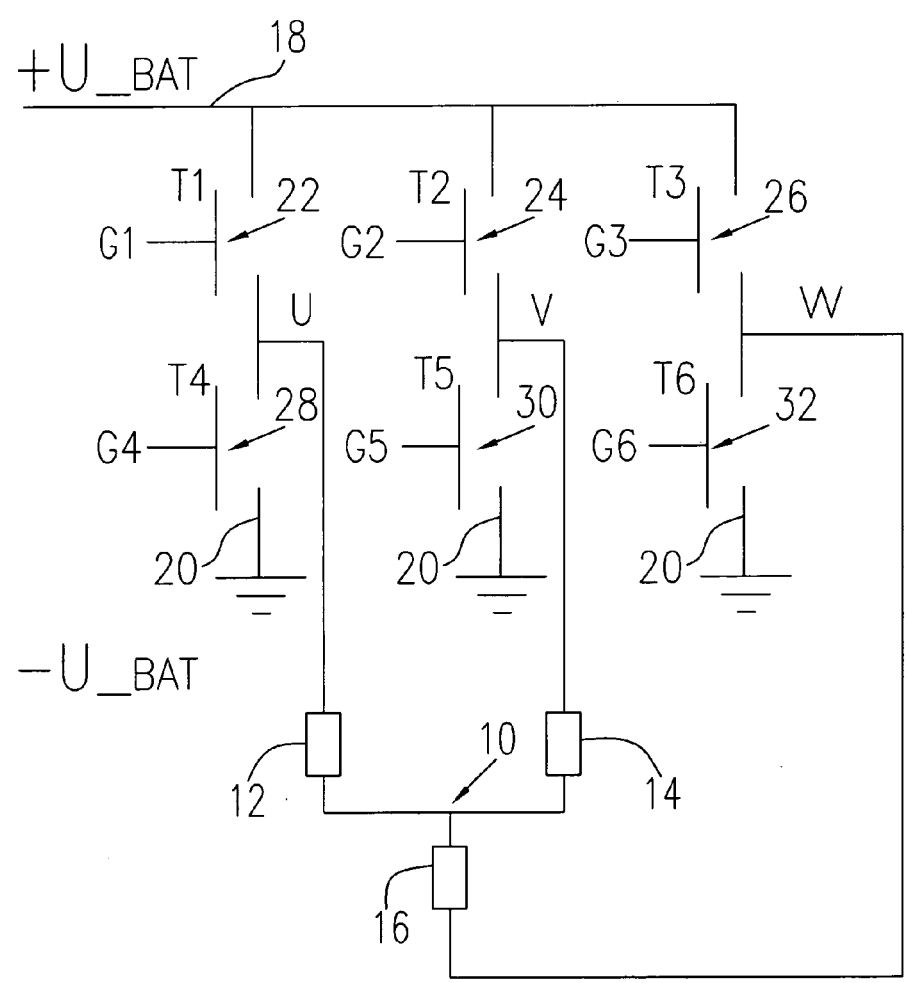
FIG. 1 shows a schematic circuit diagram of a drive electronic for a three-phase motor.

FIG. 1 illustrates a schematic circuit diagram of a drive electronic for a three-phase motor. The motor has three phase windings (U, 12; V, 14; W, 16) shown in FIG. 1 in a Y(Wye) configuration 10. The three windings 12, 14, 16 are connected between a positive current bus bar 18 and a negative current bus bar 20. The potential $+U_{BAT}$ is provided on the positive current bus bar 18, the potential $-U_{BAT}$ is provided on the negative current bus bar 20. According to the drive signals, the phase windings 12, 14, 16 are connected and disconnected to the supply bars 18, 20 via six power switching components (T1, 22; T2, 24; T3, 26; T4, 28; T5, 30; T6, 32). The power switching components 22 to 32 are preferably MOSFET power transistors. They have drive control pins, denoted with G1 to G6 in FIG. 1. The drive control pins correspond in particular with the power transistor gates. The application of suitable drive signals to the power transistor gates energizes the phase windings 12 to 16 in the motor in order to control its operation. Methods for driving a brushless electronically-commutated motor are, for example, described in DE 100 33 561 A1 and U.S. Pat. No. 6,400,109 B1, which are incorporated by reference.

Figure 2:
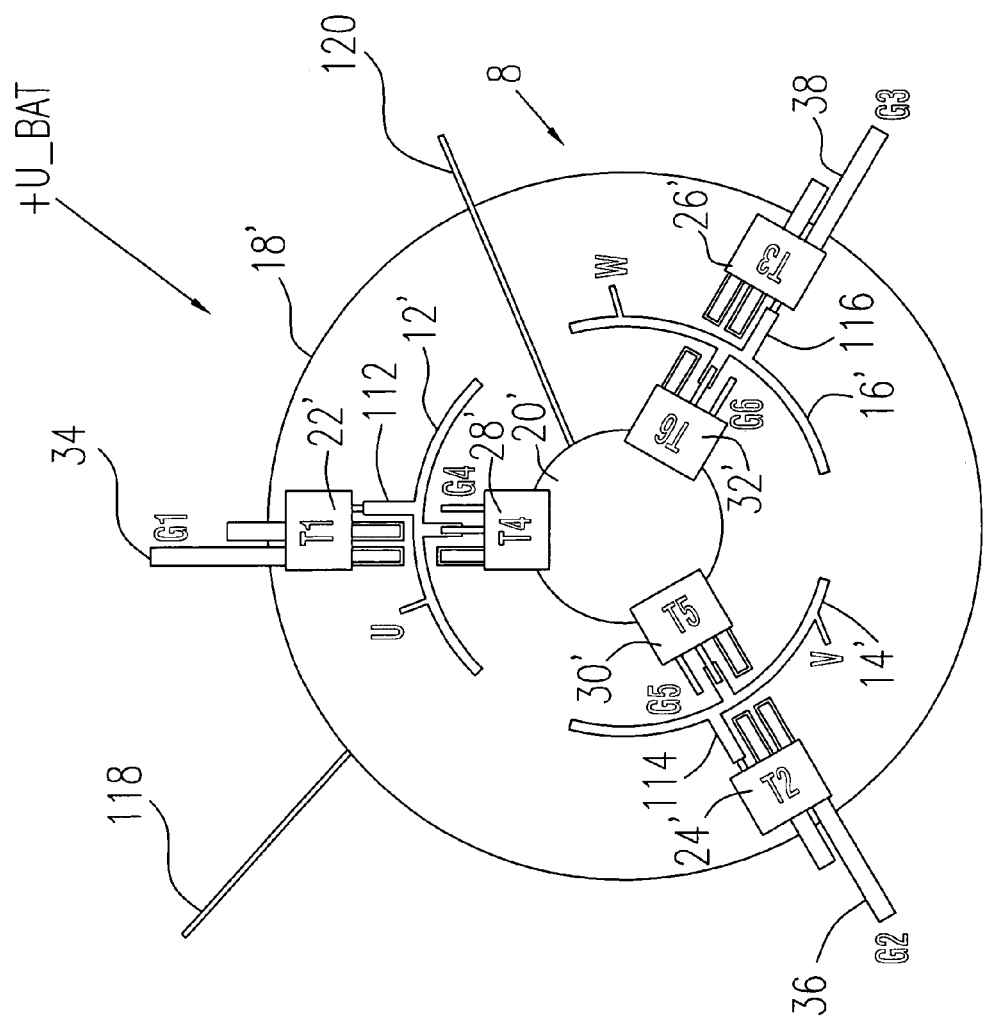
FIG. 2 shows a schematic top (plan) view of a device for connecting electronic components in accordance with the invention.

According to the invention, the power switching components 22 to 32, the current supply bus bars 18, 20 and the phase windings 12, 14, 16 of the motor are directly connected to the lead frame which incorporates the tracks required in order to put the circuit shown in FIG. 1 into practice. FIG. 2 shows an example of such a lead frame.

The lead frame structure 8 shown in FIG. 2 implements the circuit shown in FIG. 1, with respective components and connections denoted with equivalent reference numbers marked by a slash (').

The lead frame structure 8 shown in FIG. 2 incorporates a track 18' for connection with the positive supply voltage $+U_{BAT}$ and a track 20' for connection with the negative supply voltage $-U_{BAT}$. Furthermore, tracks 12', 14' and 16' are provided for connection with the phase windings U, V and W. Power transistors T1 to T6, 22' to 32' are electrically connected directly to lead frames 112, 114 and 116, the lead frames acting as a support component for the power transistors, thus minimizing resistance caused by additional cable wire lengths and plug or solder connections.

FIG. 2 in particular shows a circular, symmetrical arrangement for the power transistors T1 to T6, 22' to 26' and the associated tracks 12' to 20'. The drain pins of the transistors T1 to T3, 22' to 26' are connected to track 18' (which is connected to the positive $+U_{BAT}$ battery voltage). The source pins of transistors T4 to T6, 28' to 32' are connected to track 20' (which is connected to the negative $-U_{BAT}$ battery voltage). The source and drain pins of transistors T1 and T4, T2 and T5 and T3 and T6 are respectively connected to each other, each having a connection 12', 14', 16' for phase windings U, V and W. The gate pins G1 to G6 of transistors 22' to 32' are leading away from the motor to the control electronics via separate connection tracks 34, 36, 38 (of which only three are shown in FIG. 2), the control electronic in turn triggering the power switches or power transistors T1 to T6. The connection of gates G1 to G6 of the power transistors T1 to T6 via separate tracks with the drive electronics is non-critical, due to the low current value. This means that the additional resistance resulting from this connection is negligible relative to the motor power loss.

The arrangement of the lead frame illustrated in FIG. 2 has the advantage that the motor phase windings can be lead and connected to the lead frame along the shortest distance, thanks to the symmetrical distribution of the tracks 12', 14', 16' and power transistors T1 to T6, 22' to 32', wherein current distribution within the lead frame is symmetrical, minimizing losses and ensuring uniform triggering of individual motor phases. The lead frame according to the invention thus ensures a uniform and low loss current distribution under absolutely symmetric conditions on both the tracks that carry high currents and on the power switching components without the use of any plug connections.

According to the present invention, it is intended that the phase windings are connected to the lead frame by soldering or welding. The cross section of individual tracks of the lead frame can thus be optimized, so that the resistance of these tracks is negligible under practical conditions and tracks do not heat up during operation. Additionally in order to improve heat dissipation, stamped and bent elements can be provided which protrude from the tracks. The individual tracks of the lead frame in accordance with the invention can be located in one or more planes.

In a preferred embodiment of the invention the lead frame shown in FIG. 2 can be fitted to a support component which ensures the insulation between the tracks as well as the positioning of the tracks relative to each other. The current supply bars and the phase windings can be soldered or welded to the flat tracks on the lead frame. Alternatively, tabs or lugs which are stamped and bent at a right angle can be used in order to connect the tracks, the phase windings and/or the power transistors.

Figure 3:
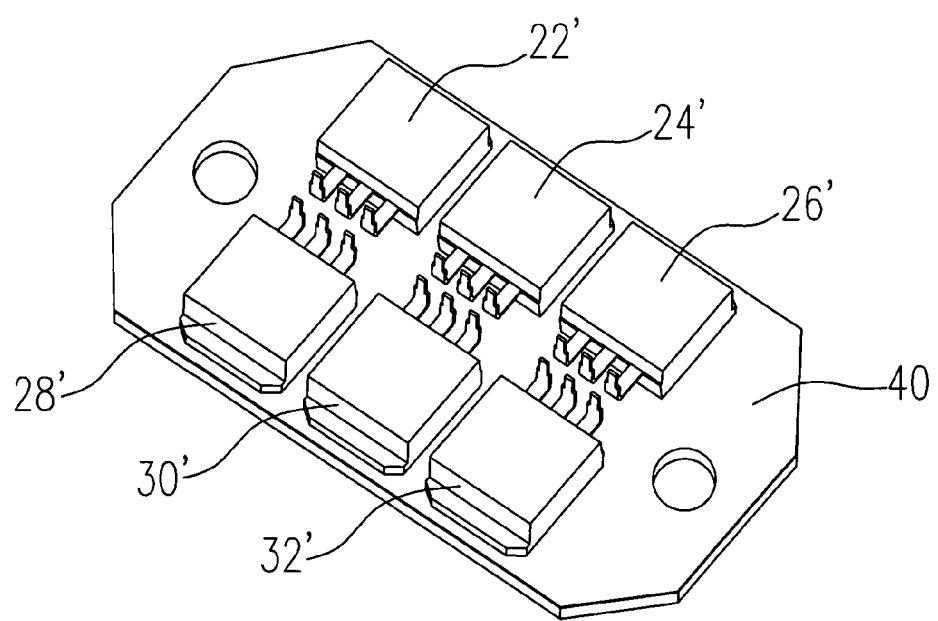
FIG. 3 shows the arrangement of several power transistors on a carrier.

FIG. 3 shows the arrangement of transistors 22' to 32' on a carrier 40. The carrier 40 is used to fix the transistors 22' to 32' and can, in accordance with the invention, also act as a heat sink. The arrangement of the transistors 22' to 32' shown in FIG. 3 may also be connected via a suitably-shaped lead frame.

The features disclosed in the aforementioned description, in the claims and in the figures may be of importance not only in the form of single items but as well as in any possible combination in order to put the invention into practice in various configurations.

Reference Numbers 10 y connection
12, 14, 16 windings
18, 20 current supply bus bar
22–32 power switching components
24, 36, 38 connection tracks
40 carrier

The invention claimed is:

1. Electric motor comprising a device for connecting electronic components for driving the electric motor, the connecting device including: a lead frame (8) having lead frame tracks (12', 14', 16', 18', 20') for connecting the power supply wires (118, 120) and the phase windings (U, V, W) of the electric motor, the tracks of the lead frame (8) being adapted for direct electrical connection of the electronic components (22', 24', 26', 28', 30', 32'), wherein the lead frame is located at a front end of the electrical motor and wherein the lead frame tracks (12', 14', 16', 18', 20') are of a rotationally symmetrical shape, and the electronic components (22', 24', 26', 28', 30', 32') on the lead frame (8) tracks (12', 14', 16', 18', 20') are arranged in a rotationally manner, so that the length of the connection wires from the phase windings (U, V, W) of the electric motor with the tracks of the lead frame is minimal.

2. The electric motor according to claim 1, wherein electronic components are power transistors.

3. The electric motor according to claim 1, wherein the lead frame (8) as tracks (18', 20') for connection with positive and negative power supply voltages (118, 120) and tracks (12', 14', 16') for connection with electrical motor phase windings (U, V, W) through control pins (G1, G2, G3, G4, G5, G6) of the electronic components (22', 24', 26', 28', 30', 32').

4. The electric motor according to claim 1, wherein the lead frame (8) is formed essentially in a single plane.

5. The electric motor according to claim 1, wherein the lead frame (8) is formed three-dimensionally.

6. The electric motor according to claim 1, wherein the lead frame (8) has stamped and bent parts which protrude from the lead frame tracks (18', 20').

7. The electric motor according to claim 6, wherein a cross section and a structure of the lead frame tracks (12', 14', 16', 18', 20') is designed so that the lead frame tracks (12', 14', 16', 18', 20') dissipate heat generated by the electronic components (22', 24', 26', 28', 30', 32').

* * * * *